March 24, 1953  L. T. MURRAY  2,632,204
APPARATUS FOR THE CONTINUOUS EXTRUSION
OF DECORATIVE THERMOPLASTIC SHEETS
Filed Feb. 14, 1951
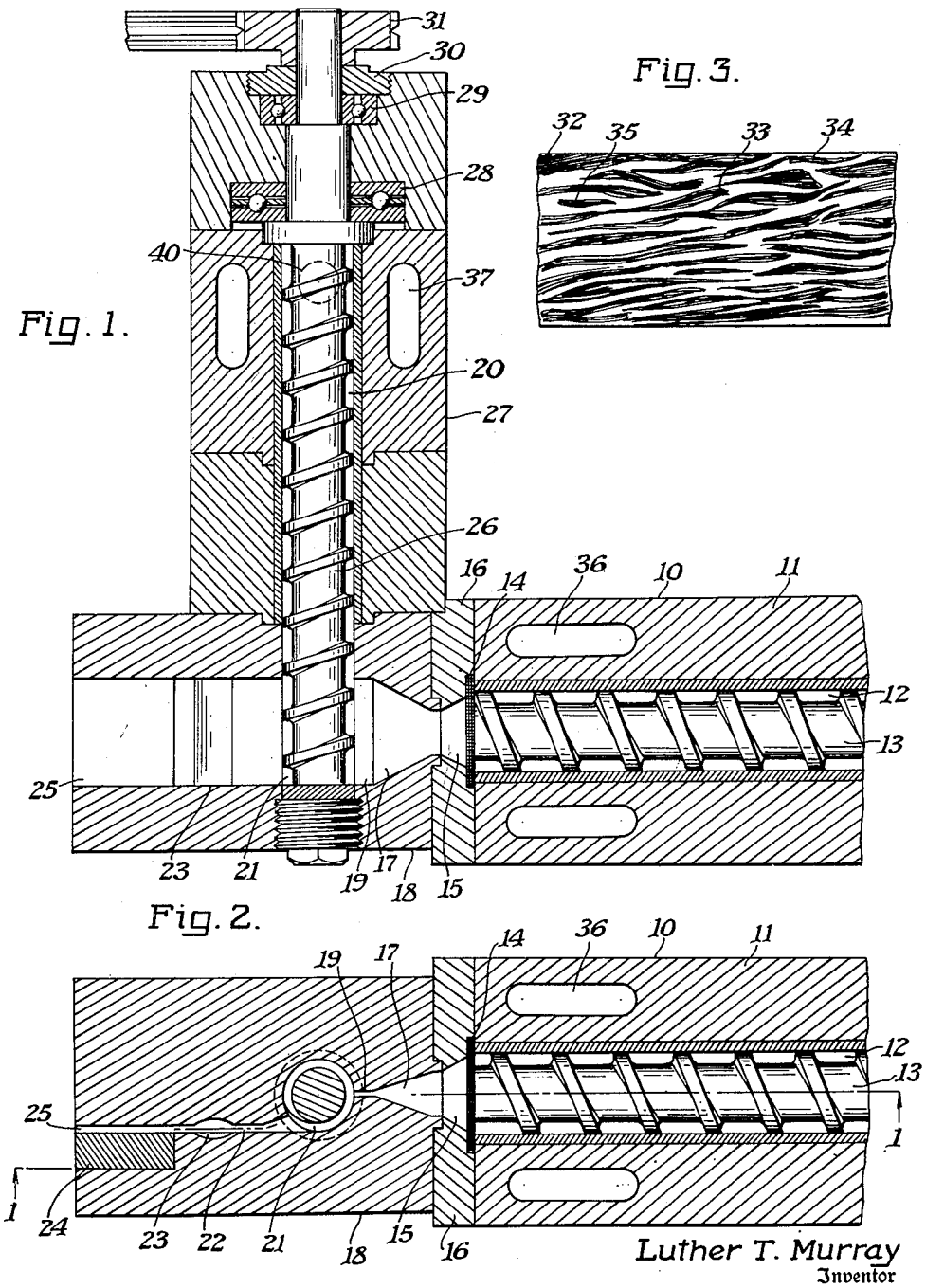
Luther T. Murray
Inventor
By Daniel I. Mayne
Walter O. Hodson
Attorneys Patented Mar. 24, 1953

2,632,204

UNITED STATES PATENT OFFICE 2,632,204

APPARATUS FOR THE CONTINUOUS EXTRUSION OF DECORATIVE THERMOPLASTIC SHEETS

Luther T. Murray, Kingsport, Tenn., assignor to Eastman Kodak Company, Rochester, N. Y., a corporation of New Jersey Application February 14, 1951, Serial No. 210,966

3 Claims. (Cl. 18—13)

This invention relates to apparatus for forming decorative effects in thermoplastic materials, and more particularly to apparatus for continuously extruding a strip or sheet of thermoplastic material having a predetermined variegated pattern therein.

The variegated strip or sheet produced in accordance with my invention is particularly useful in the manufacture of spectacle frames, and the like. Heretofore, the commercial production of extruded plastic strips for use in the manufacture of sunglass frames, and in spectacle frames, has been confined to solid colors because there was no satisfactory means of producing a variegation of substantial uniformity in decorative patterns during the extrusion operation. Attempts to secure such uniformity have included mixing granules of two components of a variegation and extruding the mixture through a conventional extruder and strip die to produce a strip with a shell pattern. Such efforts have not been very successful because the granular components blended too much and did not give a sharply defined pattern. In that method there was no control of the pattern and sections of the continuously extruded product might appear completely blended or contain only erratic streaks. Another approach to the problem of extruding variegated strips was made by feeding plastic pellets into a strip die by an air ram mounted on the die. In this operation the colored plastic forming the base of the strip was extruded continuously through a conventional extruder and the differently colored filler plastic was introduced into this strip just before it emerged from the die. This, too, proved unsuccessful because it was practically impossible to force the filler plastic in continuously, and when the filler plastic was forced in it produced only lengthwise streaks in the strip and not the desired variegated shell effect.

An object, therefore, of the present invention is to provide improved extrusion apparatus adapted to produce a continuous plastic strip or sheet having a substantially uniform variegated decorative effect therein.

Another object of the invention is to provide improved extrusion apparatus adapted to produce a continuous plastic strip or sheet having a variegated decorative effect therein which can be uniformly varied during the course of the extrusion.

In accordance with an important feature of the invention these and other objects of the invention are attained by apparatus which permit one component of the plastic material making up the strip to flow across the path of flow of another plastic component as it proceeds to the extrusion die and produce variegations therein. The thus formed variegated composition is then extruded through the die and produces a strip displaying substantially uniform variegations. By modifying the rate of flow and then maintaining the ratio of flow of one or both of the plastic components constant other variegations can be produced. It is also within the purview of the invention to vary one or both rates of flow in a progressively increasing and/or decreasing schedule if non-uniform variegated patterns are desired in the extruded strip. The preferred form of the apparatus for producing such results includes a cross-head die member through which the base component of the product strip is forced in one direction and in which member an extrusion screw is rotated across the whole path of flow of the base component and so spirally incorporates the filling material into the base material. Because of the action of the screw across the base plastic flow, the plastic filler appears as discontinuous pieces of varying sizes which occur in repetitious patterns.

Other objects, features and advantages will be readily apparent from the following detailed description of a preferred embodiment of the invention taken in conjunction with one form of the apparatus adapted for the practice of the improved methods and which is illustrated in the accompanying drawings in which:

Fig. 1 is a horizontal sectional view of my continuous extrusion apparatus, having parts broken away taken on line 1—1 of Fig. 2, Fig. 2 is a vertical sectional view; and Fig. 3 is a plan view showing typical variegations, formed in accordance with the invention, in the extruded strip.

Referring to Figs. 1 and 2 of the drawings, there is shown a continuous extrusion apparatus 10 one portion of which comprising an extrusion cylinder 11 having a bore 12 therein in which an extruding screw 13 is rotatably mounted. The extruding screw 13 is rotated by means, not shown, and will force plastic material, not shown, through the apparatus as will be understood by those familiar with this art. A screen 14 is mounted across the bore 12 at the exit end thereof and separates it from tapered cavity 15 in end plate 16. Cross head die block 18 is mounted in fluid communication with the extrusion cylinder 11 and has therein tapering cavity 17 adjacent and in communication with the tapered cavity 15.

As shown more clearly in Fig. 2, cavity 17 is in communication with slot 19 which communicates with bore 21 which in turn communicates with an extrusion passage 22, chamber 23 and the extrusion die slot 25. Member 24 is removable from the die block 18. The width of slot 25 can be varied by employing such blocks of varying sizes.

The bore 21 in cross-head die 18 contains a portion of extruding screw 26 which is also positioned in extrusion cylinder 27 in its bore 20. Thermoplastic material is added to this extrusion cylinder through throat 40 from a hopper, not shown, which is positioned thereabove. Extruding screw 26 is suitably journaled at 28, 29, and 30, and is rotated by pulley 31 which is turned by means not shown such as a variable speed motor. As is apparent from Figs. 1 and 2, thermoplastic material conveyed by screw 13 must pass through the cavity 21 which contains screw 26. As clearly shown in Fig. 2, as screw 26 rotates in the bore 21, the tops of the flights of screw 26 intercept the inlet opening and thus intercept the flow of the base material entering bore 21 from screw 13. At the same time the filler material is introduced in the spaces between the screw flights. Assuming a plastic material of a different shade is being conveyed by screw 26, a partial mixing or commingling of the two colored plastics will occur in cavity 21 and the resulting two-colored composition will be forced out through the die orifice 25.

By rotating the screws at predetermined constant rates a continuous strip of material can be produced containing the two-colored plastics in a substantially uniform variegated pattern. A typical pattern is shown in Fig. 3 in which 32 represents the product plastic strip and 33, 34 and 35 represent continuously reoccurring variegations in with the strip. Such a strip of variegated plastic is particularly suited for use in the manufacture of spectacle frames.

However, as indicated above, by varying the rates of rotation of one or both of the two screws, many different variegations can be constantly produced in the strip. In fact, a continuously varying variegation can be produced in the strip, if that is desired, by intermittently varying the rotation of one or both screws at predetermined intervals.

While Figs. 1 and 2 of the drawings depict the features relating primarily to the present invention, it will be understood that the other usual conventional parts of extrusion equipment would be present in the device such as feed hoppers, means for handling the extruded strip, and so forth.

In place of heating chambers 36 and 37, electric heaters could be employed and the usual steam, hot fluid or inductance heating could be employed in the conventional manners.

If desired, each screw may deliver a partially mixed two- or more color plastic composition thereby producing by the operation described above many other interesting variegated materials. The faster the filling screw 26 is rotated the closer together or the finer is the variegated pattern obtained. Conversely, by running this screw slowly, the pattern will be spread quite far apart in the resultant strip.

It has been found that when the filler material is slightly softer than the base material, the best results are had in obtaining a good pattern. If the die is operated at relatively low temperature the surface of the finished strip will be rough while if the die or materials are too hot, the blending will be excessive and a sharp pattern will not be produced.

The operation of the apparatus may be further described in detail in connection with the extrusion of a continuous strip employing a base material having an amber color and a filler material having a brown color. During this extrusion the conditions of operation were as follows: The temperature of the extrusion cylinder 11 was maintained adjacent the cross-head die approximately at 400° F. with a temperature of approximately 360° F. adjacent the place, not shown, where the granular thermoplastic material was introduced. The temperature of extrusion cylinder 27 was maintained at 400° F. adjacent the cross-head die but the feed section was at room temperature. The temperature of die block 18 was maintained at 395° F. The strip was extruded at a rate of 2 to 4 feet per minute and the screw 26, the filling screw, had a speed range of from 6 to 48 R. P. M. and was varied within these limits to produce different effects. When the strip was extruded at 2 feet per minute and the filling screw rotated at 20 R. P. M., a strip was extruded having substantially identical variegated patterns along its total length.

It is emphasized that a particularly novel feature of my invention is the provision of the filler screw which conducts filling material entirely across the flow of the base plastic material, as contrasted to other arrangements in which the filler was more or less concentrated on the sides or the surfaces of the base material being extruded. This permits a cross-section of the strip to have a substantially uniform pattern rather than merely an outer surface pattern.

The advantage of the filler screw operation can easily be determined by operating the base plastic screw after the base and filler screw convolutions have been filled with filler plastic, without turning the filler screw. In this case the filler plastic will make only straight line inserts in the strip being extruded through the die no variegation being produced.

Various combinations of thermoplastic extruding compositions may be employed in accordance with my invention to form variegated articles. Such compositions include cellulose organic acid ester thermoplastics such as cellulose acetate, cellulose butyrate, cellulose acetate butyrate, and other types known to the art such as methyl methacrylate and styrene. The materials may be suitably colored to produce contrasting variegations as will be understood by those familiar with this art.

While the invention is described particularly in respect to producing a flat strip, other types of die orifices can be employed to produce rods, tubes or other shapes in place of the slotted die to permit the manufacture of such articles in variegated patterns.

What I claim and desire to secure by Letters Patent of the United States is:

1. In extrusion apparatus a cross-head extrusion die block with an extrusion passage therethrough having an input end and terminating in a die orifice, an extrusion cylinder mounted in communication with said input end, means including an extrusion screw in said cylinder for forcing plastic composition into the passage and through the die orifice, a second extrusion passage in said cross-head die block positioned entirely across said first extrusion passage and in communication therewith and having an input end, a second extrusion cylinder in communication with said second input end, a screw positioned in said second extrusion cylinder and extending the length of said second extrusion passage in said cross-head die block, means including the screw for forcing a second plastic material entirely across the path of flow of said first plastic material, the resulting composite plastic being forced out of the second extrusion passage and through the die orifice by said first means, said extrusion screws being adapted to rotate at predetermined relative rates of rotation.

2. In extrusion apparatus a cross-head extrusion die block with an extrusion passage therethrough having an input end and terminating in a die orifice, an extrusion cylinder mounted in communication with said input end, means including an extrusion screw in said cylinder for forcing plastic composition into the passage and through the die orifice, a second extrusion passage in said cross-head die block positioned radially to and intersecting said first extrusion passage and only extending thereacross and in communication therewith and having an input end, a second extrusion cylinder in communication with said second input end, a screw positioned in said second extrusion cylinder and extending the entire length of said second extrusion passage in said cross-head die block, means including the screw for forcing a second plastic material across the entire path of flow of said first plastic material, the screw contacting both plastics in the die block, the resulting composite plastic being forced through the die orifice by said first means, said screws being adapted to rotate at predetermined relative rates of rotation.

3. In extrusion apparatus a cross-head extrusion die block with a slot-like extrusion passage therethrough having an input end and terminating in a die orifice, an extrusion cylinder mounted in communication with said input end, means including an extrusion screw in said cylinder for forcing plastic compositions into the passage and through the die orifice, a cylindrical extrusion passage in said cross-head die block positioned radially to and intersecting said slot-like extrusion passage and only extending thereacross and in communication therewith, a second extrusion cylinder in communication with said second input end, a screw positioned in said second extrusion cylinder and extending the entire length of said second extrusion passage in said cross-head die block, means including the screw for forcing a second plastic material entirely across the path of flow of said first plastic material, the screw contacting both plastics in the die block, the resulting composite plastic being forced through the die orifice by said first means, said screws being adapted to rotate at predetermined relative rates of rotations.

LUTHER T. MURRAY.

REFERENCES CITED

The following references are of record in the file of this patent:

UNITED STATES PATENTS

| Number | Name | Date |
| --- | --- | --- |
| 484,777 | Chase | Oct. 25, 1892 |
| 1,095,979 | Eberhard | May 5, 1914 |
| 1,356,891 | Steinle | Oct. 26, 1920 |